United States Patent
Ota et al.

(10) Patent No.: US 9,641,106 B2
(45) Date of Patent: May 2, 2017

(54) ELECTRIC VEHICLE AND CONTROL METHOD OF ELECTRIC VEHICLE

(71) Applicant: Toyota Jidosha Kabushiki Kaisha, Toyota-shi Aichi-ken (JP)

(72) Inventors: Takashi Ota, Toyota (JP); Ryoji Sato, Toyohashi (JP); Masayoshi Suhama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 112 days.

(21) Appl. No.: 14/592,330

(22) Filed: Jan. 8, 2015

(65) Prior Publication Data

US 2015/0200613 A1 Jul. 16, 2015

(30) Foreign Application Priority Data

Jan. 10, 2014 (JP) ................. 2014-003399

(51) Int. Cl.

| H02P 3/14 | (2006.01) |
| H02P 3/18 | (2006.01) |
| B60L 7/00 | (2006.01) |
| B60W 20/00 | (2016.01) |
| B60K 6/00 | (2006.01) |
| H02P 5/74 | (2006.01) |

(52) U.S. Cl.
CPC .............. *H02P 3/18* (2013.01); *B60L 7/00* (2013.01); *H02P 5/74* (2013.01)

(58) Field of Classification Search
None
See application file for complete search history.

(56) References Cited

U.S. PATENT DOCUMENTS

| 5,549,172 A * | 8/1996 | Mutoh | B60L 11/18 180/65.1 |
| 7,891,451 B2 * | 2/2011 | Oyobe | B60L 11/1842 180/65.21 |
| 8,868,270 B2 * | 10/2014 | Takahashi | B60L 3/108 318/376 |
| 9,246,417 B1 * | 1/2016 | Connolly | H02P 3/14 |
| 2005/0159871 A1 * | 7/2005 | Nakamura | B60T 8/1755 701/70 |
| 2008/0185199 A1 * | 8/2008 | Kimura | B60K 6/445 180/242 |

(Continued)

FOREIGN PATENT DOCUMENTS

| JP | H07-015804 A | 1/1995 |
| JP | 2014213654 A * | 11/2014 |

*Primary Examiner* — Bentsu Ro
*Assistant Examiner* — Said Bouziane
(74) *Attorney, Agent, or Firm* — Dinsmore & Shohl LLP

(57) ABSTRACT

An electric vehicle driven by a synchronous motor 21 and an induction motor 31, and braked with a first regenerative torque $BT_1$ generated by the synchronous motor generator 21 and a second regenerative torque $BT_2$ generated by the induction motor generator 31. The ratio of the first regenerative torque $BT_1$ to the second regenerative torque $BT_2$ is changed in accordance with a state of charge (SOC) of a battery 11. In this way, a switching frequency from a regenerative brake to a hydraulic brake is restricted to improve drivability when a state of charge (SOC) of the battery 11 is high.

11 Claims, 5 Drawing Sheets

(56) References Cited

U.S. PATENT DOCUMENTS

| | | | |
|---|---|---|---|
| 2009/0159351 A1* | 6/2009 | Ando | B60K 6/445 180/65.265 |
| 2012/0086369 A1* | 4/2012 | Kitanaka | B60L 7/16 318/139 |
| 2015/0224981 A1* | 8/2015 | Fujishiro | B60W 10/06 701/22 |

* cited by examiner

ELECTRIC VEHICLE AND CONTROL METHOD OF ELECTRIC VEHICLE

CROSS-REFERENCE TO RELATED APPLICATION

This application claims priority to Japanese Patent Application No. 2014-003399, filed on Jan. 10, 2014, which is incorporated herein by reference in its entirety.

BACKGROUND

Technical Field

The present invention relates to an electric vehicle, and more particularly to a structure of an electric vehicle driven by a synchronous motor and an induction motor, and a control method of the electric vehicle.

Related Art

Recently, electric vehicles driven by an electric motor are in widespread use. There are many types of electric motors such as permanent-magnet type synchronous motors, induction motors, and reluctance type motors, with various characteristics. Therefore, it is proposed to configure a drive system of an electric vehicle with desired functions by combining characteristics of two or more types of electric motors to achieve mutually complementary characteristics (refer to, for example, JP H07-15804).

JP H07-15804 proposes a drive system which drives front wheels by a permanent-magnet type synchronous motor with high efficiency and a small capacity, and drives rear wheels by an induction motor with a large capacity and a high base speed. In this drive system, a method is proposed to distribute a drive torque requirement issued through a gas pedal to a torque command for the permanent-magnet type synchronous motor and a torque command for the induction motor based on various conditions such as a rotation speed of the front wheels and the rear wheels, acceleration speed, tilt angle of a vehicle body, battery voltage, electric current, temperature of an electric motor, uphill or downhill, in acceleration or deceleration, and a state of a road surface.

SUMMARY

In an electric vehicle, electric power regeneration is performed by using a driving electric motor as a power generator; and a regenerative torque generated at that time is used to apply a regenerative brake to brake the vehicle. In actuating the regenerative brake, electric power from an electric motor serving as an electric power generator is charged to a battery. When a state of charge (SOC) of a battery is high because of, for example, running down a long downhill stretch, it becomes necessary to limit the regenerative electric power in order to avoid overcharge of the battery. On this occasion, apart of braking force is switched from the regenerative brake to a hydraulic brake because the braking force by the regenerative brake is lowered for the amount of the limited regenerative electric power. It has been a problem that drivability is lowered due to occurrence of torque fluctuation when switching from the regenerative brake to the hydraulic brake. The present invention has an object to improve drivability by restricting the frequency of switching from the regenerative brake to the hydraulic brake when the state of charge (SOC) of the battery is high.

An electric vehicle according to the present invention includes a synchronous motor; and an induction motor; wherein the electric vehicle is driven by the synchronous motor and the induction motor, and braked with a first regenerative torque generated by the synchronous motor and a second regenerative torque generated by the induction motor. The electric vehicle further includes a battery which supplies a drive electric power to the synchronous motor and the induction motor, and receives a regenerative electric power from the synchronous motor and the induction motor; and a ratio of the first regenerative torque to the second regenerative torque is changed in accordance with a state of charge of the battery.

In an electric vehicle according to the present invention, it is preferable that when the state of charge of the battery is high, the proportion |[SB1] of the second regenerative torque is set higher than when the state of charge of the battery is low.

In an electric vehicle according to the present invention, it is preferable that when the state of charge of the battery exceeds a first threshold, the proportion of the second regenerative torque is increased while the proportion of the first regenerative torque is decreased along with an increase of the state of charge of the battery.

In an electric vehicle according to the present invention, it is preferable that when the state of charge of the battery is equal to or more than a second threshold, the proportion of the second regenerative torque is set at 100% and the ratio of the first regenerative torque is set at 0%.

In an electric vehicle according to the present invention, it is preferable that the second threshold is the state of charge of the battery at which a limit starts to be applied to a maximum regenerative electric power of the battery, and the first threshold is smaller than the second threshold.

An electric vehicle according to the present invention includes a synchronous motor; and an induction motor; wherein the electric vehicle is driven by the synchronous motor and the induction motor, and braked with a first regenerative torque generated by the synchronous motor and a second regenerative torque generated by the induction motor. The electric vehicle further includes a battery which supplies a drive electric power to the synchronous motor and the induction motor, and receives a regenerative electric power from the synchronous motor and the induction motor; and a controller including a CPU, with the CPU of the controller executing a torque ratio setting program which changes a ratio of the first regenerative torque to the second regenerative torque in accordance with a state of charge of the battery.

A controlling method of an electric vehicle according to the present invention is a method for an electric vehicle including a synchronous motor; an induction motor; and a battery which supplies a drive electric power to the synchronous motor and the induction motor, and receives a regenerative electric power from the synchronous motor and the induction motor, wherein the electric vehicle is driven by the synchronous motor and the induction motor, and braked with a first regenerative torque generated by the synchronous motor and a second regenerative torque generated by the induction motor; and the ratio of the first regenerative torque to the second regenerative torque is changed in accordance with a state of charge of the battery.

The present invention achieves an advantage that drivability is improved by restricting the frequency of switching from the regenerative brake to the hydraulic brake when the state of charge (SOC) of the battery is high.

DETAILED DESCRIPTION

Figure 1:
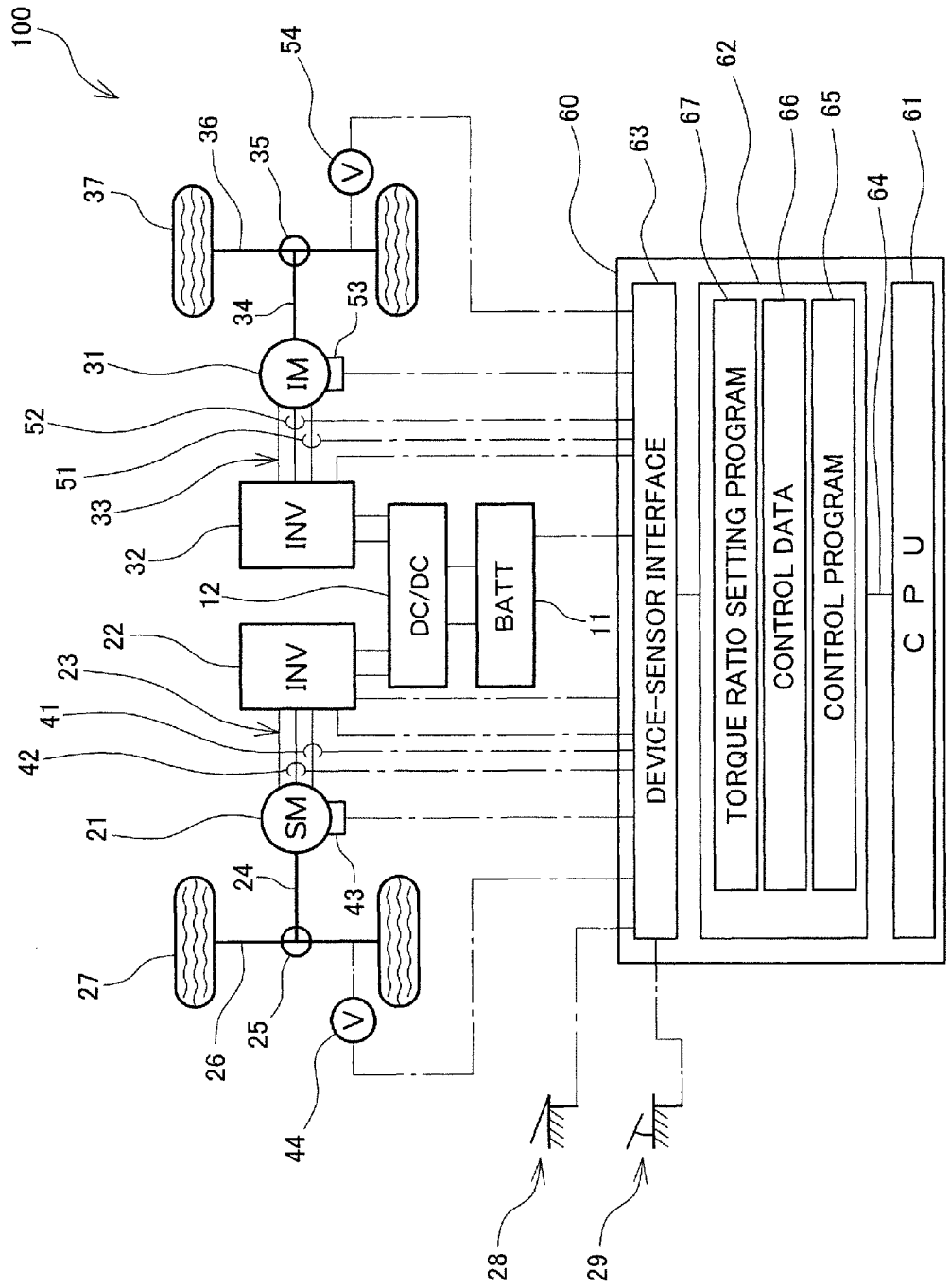
FIG. 1 is a system diagram showing a configuration of an electric vehicle according to an embodiment of the present invention.

Embodiments of the present invention are described below with reference to the attached drawings. As shown in FIG. 1, an electric vehicle 100 according to an embodiment of the present invention is provided with front wheels 27 driven with a first drive torque $T_1$ generated by a synchronous motor generator 21 which is a synchronous motor, and rear wheels 37 driven with a second drive torque $T_2$ generated by an induction motor generator 31 which is an induction motor. The electric vehicle 100 brakes the front wheels 27 and the rear wheels 37 respectively with a first regenerative torque $BT_1$ generated by the synchronous motor generator 21 and a second regenerative torque $BT_2$ generated by the induction motor generator 31. Accordingly, the sum of the first drive torque $T_1$ generated by the synchronous motor generator 21 and the second drive torque $T_2$ generated by the induction motor generator 31 ($T_1+T_2$) is a total drive torque T of the electric vehicle 100; and the sum of the first regenerative torque $BT_1$ generated by the synchronous motor generator 21 and the second regenerative torque $BT_2$ generated by the induction motor generator 31 ($BT_1+BT_2$) is a total regenerative torque BT (total regenerative brake torque) of the electric vehicle 100. It should be noted that because the diameter of the front wheels 27 and the diameter of the rear wheels 37 are identical in this embodiment, the ratio of the first drive torque $T_1$ to the second drive torque $T_2$ ($T_1:T_2$) is equal to the ratio of the driving force of the front wheels 27 to the driving force of the rear wheels 37. Similarly, the ratio of the first regenerative torque $BT_1$ to the second regenerative torque $BT_2$ ($BT_1:BT_2$) is equal to the ratio of the braking force of the front wheels 27 to the braking force of the rear wheels 37.

As shown in FIG. 1, ADC electric power supplied from a battery 11 which is a rechargeable and dischargeable secondary cell. After the DC electric power is boosted by a boost converter 12 to a boost DC electric power, the boost DC electric power is converted to a three phase AC electric power by an inverter 22. And three phase AC electric power is supplied to the synchronous motor generator 21. A DC electric power supplied from the common battery 11, and after the DC electric power is boosted by the common boost converter 12 to a boost DC electric power, the boost DC electric power is converted to three phase AC electric power by an inverter 32. And three phase AC electric power is supplied to the induction motor generator 31. Further, the regenerative electric power generated respectively by the synchronous motor generator 21 and the induction motor generator 31 is charged to (received by) the battery 11.

The inverters 22, 32 are respectively connected to output line groups 23, 33, having three lines, each outputting electric current in each phase (U, V, or W). The output line groups 23, 33 are respectively connected to the synchronous motor generator 21 and the induction motor generator 31, and each line of each of the output line groups 23, 33 is connected to an input terminal of each phase (U, V, or W) of the synchronous motor generator 21 or the induction motor generator 31. In the present embodiment, current sensors 41, 42, 51, 52 for sensing an electric current are attached to a V-phase output line and a W-phase output line of each of the inverters 22, 32. It should be noted that although no current sensor is attached to U-phase output lines, a U-phase electric current can be obtained based on the V-phase and W-phase electric currents because the sum of the electric currents in U, V, and W phases is equal to zero in three-phase AC electric current.

An output shaft 24 of the synchronous motor generator 21 is connected to a drive mechanism 25 such as a differential gear and a deceleration gear. The drive mechanism 25 drives or brakes the front wheels 27 by converting the first drive torque $T_1$ or the first regenerative torque $BT_1$ output from the synchronous motor generator 21 to a drive force or brake force of a front axle 26. The axle 26 is provided with a vehicle speed sensor 44 which senses a vehicle speed based on rotation speed of the axle 26. The synchronous motor generator 21 is provided with a resolver 43 which senses a rotation angle or a rotation speed of a rotor.

Similarly to the output shaft 24 of the synchronous motor generator 21, an output shaft 34 of the induction motor generator 31 is connected to a drive mechanism 35 such as a differential gear and a deceleration gear. The drive mechanism 35 drives or brakes the rear wheels 37 by converting the second drive torque $T_2$ or second regenerative torque $BT_2$ output from the induction motor generator 31 to a drive force or brake force of a rear axle 36. The axle 36 is provided with a vehicle speed sensor 54 similarly to the axle 26. Further, similarly to the synchronous motor generator 21, the induction motor generator 31 is provided with a resolver 53 which senses a rotation angle or a rotation speed of a rotor.

The electric vehicle 100 according to the present embodiment is provided with a gas pedal depression amount sensor 28 and a brake pedal depression amount sensor 29 which respectively sense the depression amount of the gas pedal and the brake pedal.

As shown in FIG. 1, a controller 60 includes a CPU 61 which performs operations, a storage unit 62, and a device-sensor interface 63, all of which form a computer connected via a data bus 64. The storage unit 62 stores a control program 65, control data 66, and a torque ratio setting program 67 (described further below) of the electric vehicle 100. The torque ratio setting program 67 is embedded with a map defining a ratio of the first regenerative torque $BT_1$ of the synchronous motor generator 21 to the second regenerative torque $BT_2$ of the induction motor generator 31 ($BT_1:BT_2$) with respect to the state of charge (SOC) of the battery shown in FIG. 3A. An optimum efficiency line e and characteristics curve c of the induction motor generator 31 shown in FIG. 5 described further below are stored in the control data 66. The boost converter 12 and the inverters 22, 32 are connected to the controller 60 via the device-sensor interface 63 such that the boost converter 12 and the inverters 22, 32 are operated based on commands from the controller 60. The battery 11 is connected to the controller 60 via the device-sensor interface 63. The state of charge (SOC) of the battery 11 is input to the controller 60. Similarly, the outputs from the current sensors 41, 42, 51, 52, the resolvers 43, 53, the vehicle speed sensors 44, 54, the gas pedal depression amount sensor 28, and the brake pedal depression amount sensor 29 are configured to be input to the controller 60 via the device-sensor interface 63.

Figure 2:
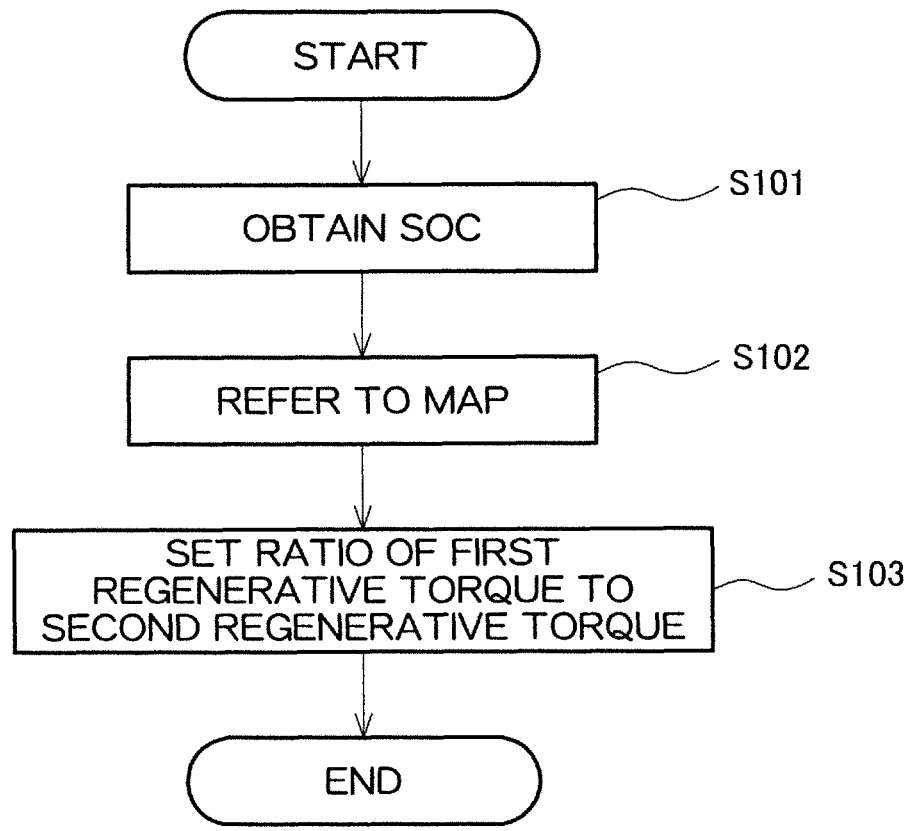
FIG. 2 is a flowchart showing operations of an electric vehicle according to an embodiment of the present invention.

Operations of the electric vehicle 100 configured as described above are described below with reference to FIGS. 2, and 3A to 3C. As shown in step S101 in FIG. 2, the controller 60 executes the torque ratio setting program 67 in the storage unit 62 shown in FIG. 1 to obtain the state of charge (SOC) of the battery 11. The SOC may be obtained, for example, from an open circuit voltage of the battery 11, or a discharge characteristic curve of the battery 11, or a voltage-current characteristic curve for the state of charge (SOC) by sensing an output voltage and an output current of the battery 11.

Figure 3A:
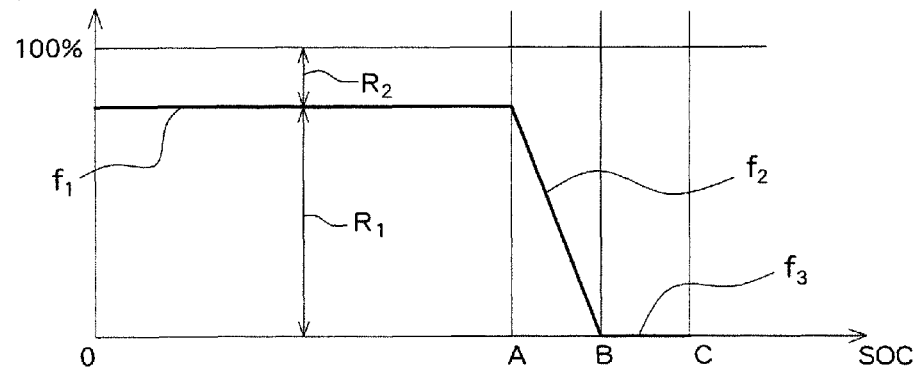
FIG. 3A is a graph showing a change in torque ratio with respect to a state of charge (SOC) of a battery of an electric vehicle according to an embodiment of the present invention.

Then, the controller 60 refers to a map (FIG. 3A) embedded in the torque ratio setting program 67. The map defines a ratio of the first regenerative torque $BT_1$ of the synchronous motor generator 21 to the second regenerative torque $BT_2$ of the induction motor generator 31 ($BT_1:BT_2=R_1:R_2$) with respect to the state of charge (SOC) of the battery 11, and sets a ratio of the first regenerative torque $BT_1$ of the synchronous motor generator 21 to the second regenerative torque $BT_2$ of the induction motor generator 31 ($R_1:R_2$) in accordance with the state of charge (SOC) of the battery 11, as shown in step S103 in FIG. 2. As shown with a line $f_1$ in FIG. 3A, when the state of charge (SOC) of the battery 11 is low (below or equal to a first threshold A (SOC≤first threshold A)), the ratio $R_1$ of the first regenerative torque $BT_1$ of the synchronous motor generator 21 having a higher regenerative efficiency is set to be larger than the ratio $R_2$ of the second regenerative torque $BT_2$ of the induction motor generator 31 having a lower regenerative efficiency. Accordingly, the proportion $R_1$ of the first regenerative torque $BT_1$ of the synchronous motor generator 21 is higher than 50%, for example, 70 to 80% when the state of charge (SOC) of the battery 11 shown in FIG. 3A is equal to or below the first threshold A. Because the proportion $R_2$ of the second regenerative torque $BT_2$ of the induction motor generator 31 is ($100-R_1$), the proportion is below 50%, for example, 20 to 30%. Thus, when the state of charge (SOC) of the battery 11 is low, more electric power can be efficiently regenerated by the synchronous motor generator 21 having a higher regenerative efficiency such that the battery 11 can be efficiently charged. The first threshold A may be any value (for example, about 40 to 50%) lower than the state of charge (SOC) at which the limit of the maximum regenerative electric power $WIN_{max}$ starts to be applied to the battery 11.

As shown in line $f_1$ in FIG. 3A, the proportion $R_1$ of the first regenerative torque $BT_1$ and the proportion $R_2$ of the second regenerative torque $BT_2$ may be constant values until the state of charge (SOC) of the battery 11 reaches the first threshold A. Alternatively, for example, the proportion $R_1$ of the first regenerative torque $BT_1$ can be set to be decreased from 80% to 60% while the proportion $R_2$ of the second regenerative torque $BT_2$ is set to be increased from 20% to 40% along with an increase of the state of charge (SOC) of the battery 11. By setting the ratio ($R_1:R_2$) of the first regenerative torque $BT_1$ of the synchronous motor generator 21 to the second regenerative torque $BT_2$ of the induction motor generator 31 in this manner, the ratio of a maximum regenerative electric power $WIN_1$ from the synchronous motor generator 21 to the battery 11 to a maximum regenerative electric power $WIN_2$ from the induction motor generator 31 to the battery 11 also becomes $R_1:R_2$ as shown by lines t and u in FIG. 3B until the state of charge (SOC) of the battery 11 reaches the first threshold A. It should be noted that the maximum regenerative electric power $WIN_{max}$ to the battery 11 is constant at $WIN_0$ in this period.

Figure 3B:
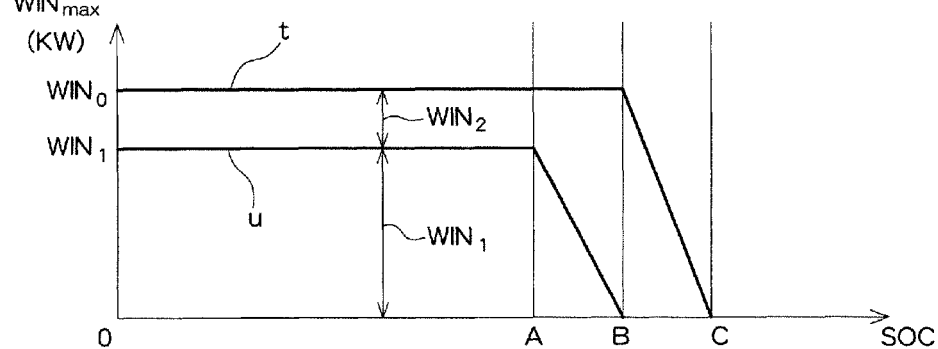
FIG. 3B is a graph showing a change in a maximum regenerative electric power ($WIN_{max}$) with respect to a state of charge (SOC) of a battery of an electric vehicle according to an embodiment of the present invention.

As shown by line $f_2$ in FIG. 3A, in a period after the state of charge (SOC) of the battery 11 passes the first threshold A and before the state of charge (SOC) of the battery 11 reaches a second threshold B which is higher than the first threshold A (first threshold A<SOC<second threshold), the proportion $R_1$ of the first regenerative torque $BT_1$ of the synchronous motor generator 21 is set to be decreased, while the proportion $R_2$ of the second regenerative torque $BT_2$ of the induction motor generator 31 is set to be increased, along with an increase of the state of charge (SOC) of the battery 11. Then, when the state of charge (SOC) of the battery 11 is at the second threshold B, the proportion $R_1$ of the first regenerative torque $BT_1$ of the synchronous motor generator 21 is set at 0 and the proportion $R_2$ of the second regenerative torque $BT_2$ of the induction motor generator 31 is set at 100%. As shown in FIG. 3B, the second threshold B is the state of charge (SOC), for example, about 60% at which the limit of the maximum regenerative electric power $WIN_{max}$ starts to be applied to the battery 11. When the state of charge (SOC) of the battery 11 reaches the second threshold B at which the limit of the maximum regenerative electric power $WIN_{max}$ starts to be applied to the battery 11, all regenerative torque BT of the electric vehicle 100 becomes the second regenerative torque $BT_2$ of the induction motor generator 31 because the proportion $R_2=100\%$. By setting the proportion $R_1$ of the first regenerative torque $BT_1$ of the synchronous motor generator 21 and the proportion $R_2$ of the second regenerative torque $BT_2$ of the induction motor generator 31 in this manner, the maximum regenerative electric power $WIN_1$ from the synchronous motor generator 21 to the battery 11 becomes zero at the second threshold B as shown by the line u in FIG. 3B, and the maximum regenerative electric power $WIN_2$ from the induction motor generator 31 to the battery 11 becomes $WIN_0$ which is equal to the maximum regenerative electric power $WIN_{max}$ to the battery 11 at the second threshold B.

As shown by a line $f_3$ in FIG. 3A, when the state of charge (SOC) of the battery 11 becomes equal to or more than the second threshold B (second threshold B≤SOC), the proportion $R_1$ of the first regenerative torque $BT_1$ of the synchronous motor generator 21 is maintained at zero, while the proportion $R_2$ of the second regenerative torque $BT_2$ of the induction motor generator 31 is maintained at 100%. Further, as shown by the line t in FIG. 3B, when the state of charge (SOC) of the battery 11 exceeds the second threshold B, the maximum regenerative electric power $WIN_{max}$ indicating the maximum chargeable amount of the battery 11 is limited below $WIN_0$, and becomes zero at a third threshold C which indicates the maximum state of charge (SOC) chargeable to the battery 11. The third threshold C may be, for example, about 80%. Thus, the maximum regenerative electric power $WIN_2$ from the induction motor generator 31 to the battery 11 is decreased from $WIN_0$ at the second threshold B to zero.

Figure 3C:
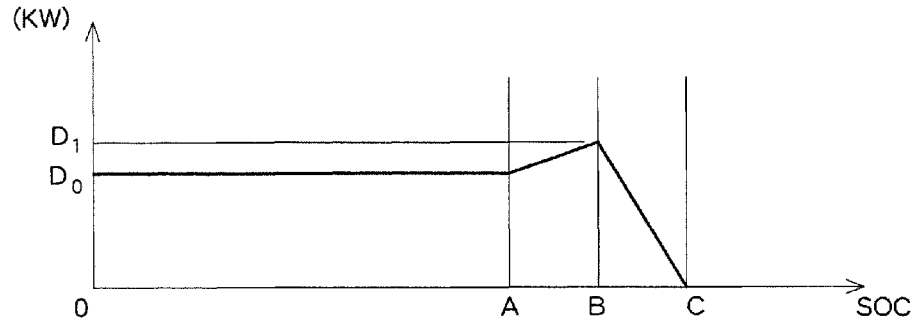
FIG. 3C is a graph showing a change in an energy loss with respect to a state of charge (SOC) of a battery of an electric vehicle according to an embodiment of the present invention.

As described above, by setting the proportion $R_1$ of the first regenerative torque $BT_1$ of the synchronous motor generator 21 having a high regenerative efficiency low, while setting the proportion $R_2$ of the second regenerative torque $BT_2$ of the induction motor generator 31 having a low regenerative efficiency high, when the state of charge (SOC)

of the battery 11 becomes high, the charge amount of electric power to the battery 11 under the same regenerative braking can be reduced and the increase of the state of charge (SOC) of the battery 11 can be restricted at the same time. Further, in this way, switching frequency from the regenerative brake to the hydraulic brake can be restricted, resulting in an advantage of improved drivability. It should be noted that because the second regenerative torque $BT_2$ of the induction motor generator 31 having a low regenerative efficiency is increased when the state of charge (SOC) of the battery 11 becomes high, an energy loss during regenerative braking is increased from $D_0$ to $D_1$ between the first threshold A and the second threshold B, as shown in FIG. 3C. Then, when the state of charge (SOC) of the battery 11 exceeds the second threshold B, because a limitation is applied to the maximum regenerative electric power $WIN_2$ from the induction motor generator 31 to the battery 11, the energy loss during regenerative braking is gradually decreased and reaches zero at the third threshold C.

Figure 4:
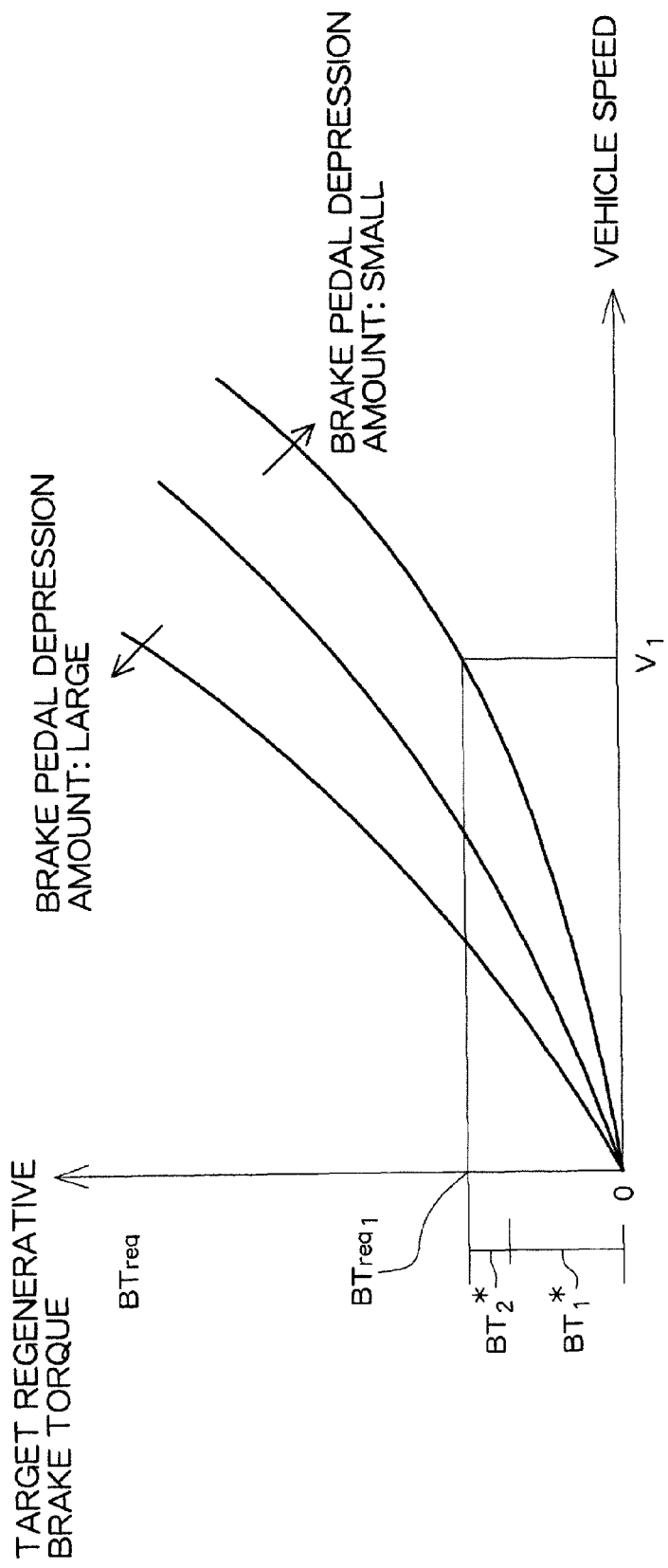
FIG. 4 is a graph showing a target regenerative brake torque with respect to a vehicle speed and a depression amount of a brake pedal of an electric vehicle according to an embodiment of the present invention.

Regenerative braking of the electric vehicle 100 according to the present embodiment is described here. The controller 60 calculates a target regenerative brake torque $BT_{req}$ based on a vehicle speed obtained by the vehicle speed sensors 44, 45 shown in FIG. 1, a depression amount of the brake pedal sensed by the brake pedal depression amount sensor 29, and a map of the target regenerative brake torque $BT_{req}$ of the electric vehicle 100 with respect to the vehicle speed and the depression amount of the brake pedal shown in FIG. 4. The target regenerative brake torque $BT_{req}$ is a target value of the brake torque by a regenerative brake among all brake torque BT required by the electric vehicle 100 through the vehicle speed and the depression amount of the brake pedal. The target regenerative brake torque $BT_{req}$ is equal to the value obtained by subtracting a mechanical brake torque, such as that produced by a hydraulic brake, from all brake torque BT required by the electric vehicle 100. For example, as shown in FIG. 4, when the depression amount of the brake pedal is small at the vehicle speed $v_1$, the target regenerative brake torque $BT_{req}$ is set as $BT_{req1}$. After calculating the target regenerative brake torque $BT_{req1}$, the controller 60 divides the target regenerative brake torque $BT_{req1}$ into a first regenerative torque command value $BT_1^*$ and a second regenerative torque command value $BT_2^*$ ($BT_1^* = BT_{req1} \times R_1 \times (R_1+R_2)$, $BT_2^* = BT_{req1} \times R_2 \times (R_1+R_2)$) in accordance with the ratio ($R_1:R_2$) of the first regenerative torque $BT_1$ to the second regenerative torque $BT_2$ which are set in accordance with the state of charge (SOC) of the battery 11. Then, the controller 60 controls the electric current of the synchronous motor generator 21 and the induction motor generator 31 in accordance with the first regenerative torque command value $BT_1^*$ and the second regenerative torque command value $BT_2^*$ to operate the electric vehicle 100 in regenerative braking.

As shown in FIG. 3A, when the state of charge (SOC) of the battery 11 exceeds the second threshold B, the regenerative electric power obtained by the regenerative brake depends on the characteristics of the induction motor generator 31. However, regenerative electric power to the battery 11 may be further reduced by increasing the absolute value of the slip frequency S of the induction motor generator 31 from $S_1$ to $S_2$ to lower the regenerative efficiency while maintaining the second regenerative torque $BT_2$ at a constant level.

Figure 5:
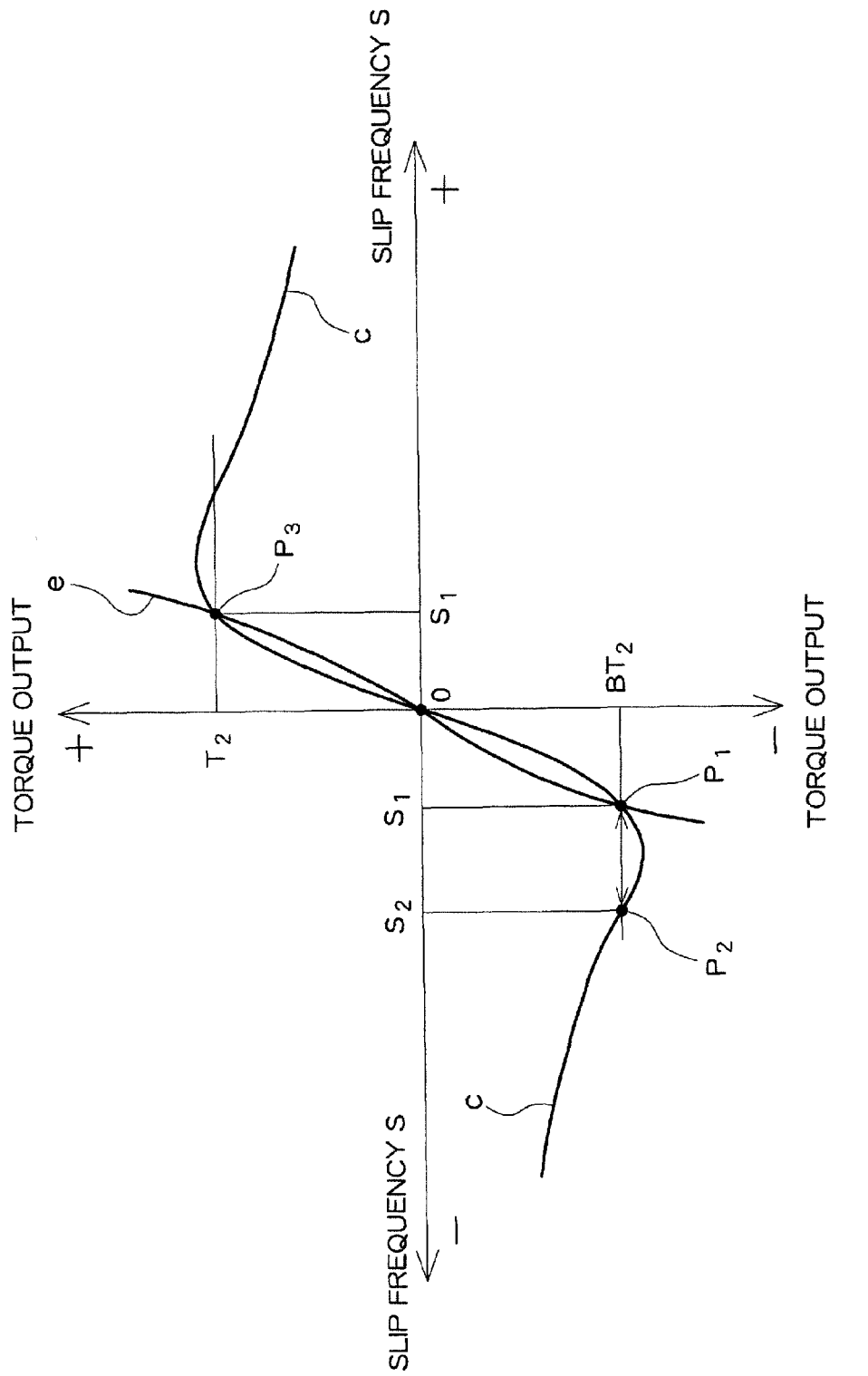
FIG. 5 is a graph showing characteristics of an induction motor generator mounted on an electric vehicle according to an embodiment of the present invention.

As shown by line c in FIG. 5, the torque output of the induction motor generator 31 with a supply of a certain electric current depends on the slip frequency S. When the slip frequency S is low, the torque output increases along with an increase of the slip frequency S. After reaching the maximum, the torque output decreases along with an increase of the slip frequency S. When the slip frequency S is a negative value, both of the torque output and the electric current become negative, causing generation of brake torque (second regenerative torque $BT_2$) and regenerative electric power. A brake torque at a certain regenerative electric power depends on the absolute value of the slip frequency S. When the absolute value of the slip frequency S is small, the brake torque increases along with an increase of the absolute value of the slip frequency S. After reaching the maximum, the torque output decreases along with an increase of the slip frequency S. Typically, the induction motor generator 31 controls the slip frequency S and the electric current along an optimum efficiency line e (most efficient operation curve) which passes operation points $P_1$, $P_3$ and zero shown in FIG. 5.

When the absolute value of the slip frequency S is increased as shown between the operation points $P_1$ and $P_2$ in FIG. 5 while maintaining the brake torque (the second regenerative torque B of the induction motor generator 31 at a constant level, regenerative efficiency is lowered because the operation point of the induction motor generator 31 departs from the operation point $P_1$ on the optimum efficiency line e. Thus, it becomes possible to reduce the regenerative electric power while maintaining the brake torque (the second regenerative torque $BT_2$) of the induction motor generator 31 at a constant level. In this way, even when the state of charge (SOC) of the battery 11 exceeds the second threshold B, further improvement of drivability become possible by further restricting the switching frequency from the regenerative brake to the hydraulic brake.

Although, in the embodiments described above, the electric vehicle 100 is described to include a single synchronous motor generator 21 driving the front wheels 27 and a single induction motor generator 31 driving the rear wheels 37, two or more synchronous motor generators 21 or induction motor generators 31 may be provided. For example, the front wheels 27 may be driven by the synchronous motor generator 21 and the induction motor generator 31, and the rear wheels 37 may be driven by another induction motor generator 31. Alternatively, the front wheels 27 may be driven by the single synchronous motor generator 21, and the rear wheels 37 may be driven by another synchronous motor generator 21 and the induction motor generator 31. When two or more synchronous motor generators 21 or induction motor generators 31 are mounted, the sum of the regenerative torques of the two or more synchronous motor generators 21 is used as the first regenerative torque $BT_1$ and the sum of the regenerative torques of the two or more induction motor generators 31 is used as the second regenerative torque $BT_2$. Although, the single boost converter 12 is described to be commonly used in the present embodiment, two or more boost converters 12 may be mounted, each for each of the motor generators.

It should be noted that the present invention is not limited to the embodiments described above, and does include all variations and modifications which do not depart from the technical scope and the essence of the present invention defined in the claims.

What is claimed is:
1. An electric vehicle comprising
a synchronous motor; and
an induction motor;
wherein the electric vehicle is driven by the synchronous motor and the induction motor, and braked with a first regenerative torque generated by the synchronous motor and a second regenerative torque generated by the induction motor;

the electric vehicle further comprises a battery which supplies a drive electric power to the synchronous motor and the induction motor, and receives a regenerative electric power from the synchronous motor and the induction motor; and a controller which adjusts the first regenerative torque and the second regenerative torque, and the controller includes a torque setting unit which changes a ratio of the first regenerative torque to the second regenerative torque in accordance with a state of charge of the battery.

2. The electric vehicle according to claim 1, wherein when the state of charge of the battery is high, the torque ratio setting unit sets the proportion of the second regenerative torque is set higher than when the state of charge of the battery is low.

3. The electric vehicle according to claim 2, wherein when the state of charge of the battery exceeds a first threshold, the torque ratio setting unit increases the proportion of the second regenerative torque and decreases the proportion of the first regenerative torque is decreased along with an increase of the state of charge of the battery.

4. The electric vehicle according to claim 3, wherein when the state of charge of the battery is equal to or more than a second threshold, the torque ratio setting unit sets the proportion of the second regenerative torque at 100% and sets the proportion of the first regenerative torque at 0%.

5. The electric vehicle according to claim 4, wherein the second threshold is the state of charge of the battery at which a limit starts to be applied to a maximum regenerative electric power of the battery, and the first threshold is smaller than the second threshold.

6. An electric vehicle comprising
a synchronous motor; and
an induction motor;
wherein the electric vehicle is driven by the synchronous motor and the induction motor, and braked with a first regenerative torque generated by the synchronous motor and a second regenerative torque generated by the induction motor;
the electric vehicle further comprises
a battery which supplies a drive electric power to the synchronous motor and the induction motor, and receives a regenerative electric power from the synchronous motor and the induction motor; and
a controller including a CPU, and
the CPU of the controller executes a torque ratio setting program which changes a ratio of the first regenerative torque to the second regenerative torque in accordance with a state of charge of the battery.

7. The electric vehicle according to claim 6, wherein when the state of charge of the battery is high, the CPU in the controller sets the proportion of the second regenerative torque higher than when the state of charge of the battery is low.

8. The electric vehicle according to claim 7, wherein when the state of charge of the battery exceeds a first threshold, the CPU in the controller increases the proportion of the second regenerative torque and decreases the proportion of the first regenerative torque along with an increase of the state of charge of the battery.

9. The electric vehicle according to claim 8, wherein when the state of charge of the battery is equal to or more than a second threshold, the CPU in the controller sets the proportion of the second regenerative torque at 100% and sets the proportion of the first regenerative torque at 0%.

10. The electric vehicle according to claim 9, wherein the second threshold is the state of charge of the battery at which a limit starts to be applied to a maximum regenerative electric power of the battery, and the first threshold is smaller than the second threshold.

11. A controlling method of an electric vehicle including:
a synchronous motor;
an induction motor; and
a battery which supplies a drive electric power to the synchronous motor and the induction motor, and receives a regenerative electric power from the synchronous motor and the induction motor,
the controlling method comprising:
driving the electric vehicle by the synchronous motor and the induction motor, and braking with a first regenerative torque generated by the synchronous motor and a second regenerative torque generated by the induction motor; and
changing the ratio of the first regenerative torque to the second regenerative torque in accordance with a state of charge of the battery.

* * * * *